(12) United States Patent
Yamamoto et al.

(10) Patent No.: US 8,873,599 B2
(45) Date of Patent: Oct. 28, 2014

(54) GAS LASER DEVICE

(75) Inventors: Tatsuya Yamamoto, Tokyo (JP); Naoki Miyamoto, Tokyo (JP); Junichi Nishimae, Tokyo (JP); Shuichi Fujikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/824,432

(22) PCT Filed: Aug. 26, 2011

(86) PCT No.: PCT/JP2011/069247
§ 371 (c)(1),
(2), (4) Date: May 10, 2013

(87) PCT Pub. No.: WO2012/035953
PCT Pub. Date: Mar. 22, 2012

(65) Prior Publication Data
US 2013/0235894 A1 Sep. 12, 2013

(30) Foreign Application Priority Data

Sep. 17, 2010 (JP) ................................. 2010-208673

(51) Int. Cl.
*H01S 3/22* (2006.01)
*H01S 3/036* (2006.01)
*H01S 3/038* (2006.01)
*H01S 3/223* (2006.01)

(52) U.S. Cl.
CPC ........... *H01S 3/038* (2013.01); *H01S 2301/203* (2013.01); *H01S 3/036* (2013.01); *H01S 3/2232* (2013.01)
USPC .......................................................... 372/58

(58) Field of Classification Search
USPC .......................................................... 372/58
See application file for complete search history.

(56) References Cited

U.S. PATENT DOCUMENTS

| 4,598,407 A * | 7/1986 | Hayashi ........................ 372/87 |
| 6,801,324 B1 * | 10/2004 | Gray et al. ................... 356/519 |
| 2008/0204682 A1 * | 8/2008 | Uehara et al. ................... 355/46 |

FOREIGN PATENT DOCUMENTS

| JP | 54 41692 | 4/1979 |
| JP | 58 168288 | 10/1983 |

(Continued)

OTHER PUBLICATIONS

Kuzumoto, M., et al., "Role of N2 gas in a transverse-flow cw CO2 laser excited by silent discharge," J. Phys. D: Appl. Phys., vol. 22, pp. 1835-1839, (1989).

(Continued)

*Primary Examiner* — Xinning Niu
*Assistant Examiner* — Vu A Vu
(74) *Attorney, Agent, or Firm* — Oblon, Spivak, McClelland, Maier & Neustadt, L.L.P.

(57) ABSTRACT

A tri-axially orthogonal gas laser device in which an optical axis of an optical resonator, a direction in which a laser gas is supplied into the optical resonator, and a direction of discharge for exciting the laser gas are mutually orthogonal to one another, the device including: an exciting unit including a blower supplying the laser gas in −X direction to the optical axis of the optical resonator, and a discharge electrode pair which is shifted on a gas upstream side with respect to the optical axis; and an exciting unit including a blower for supplying the laser gas in +X direction to the optical axis of the optical resonator, and a discharge electrode pair which is shifted on a gas upstream side with respect to the optical axis

5 Claims, 19 Drawing Sheets

(56) References Cited

FOREIGN PATENT DOCUMENTS

| | | |
|---|---|---|
| JP | 60 28288 | 2/1985 |
| JP | 61 284984 | 12/1986 |
| JP | 62 95884 | 5/1987 |
| JP | 6 45359 | 6/1994 |
| JP | 6 350164 | 12/1994 |
| JP | 9 129947 | 5/1997 |
| JP | 2862058 | 2/1999 |
| JP | 2004-207930 A | 7/2004 |
| JP | 3810459 | 8/2006 |
| JP | 2008-251960 A | 10/2008 |

OTHER PUBLICATIONS

International Preliminary Report on Patentability Issued Apirl 16, 2013 in PCT/JP11/069247 Filed Aug. 26, 2011.
International Search Report Issued Sep. 20, 2011 in PCT/JP11/069247 Filed Aug. 26, 2011.
Office Action issued May 20, 2014 in Japanese Patent Application No. 2012-533933 (with partial English Translation).

* cited by examiner

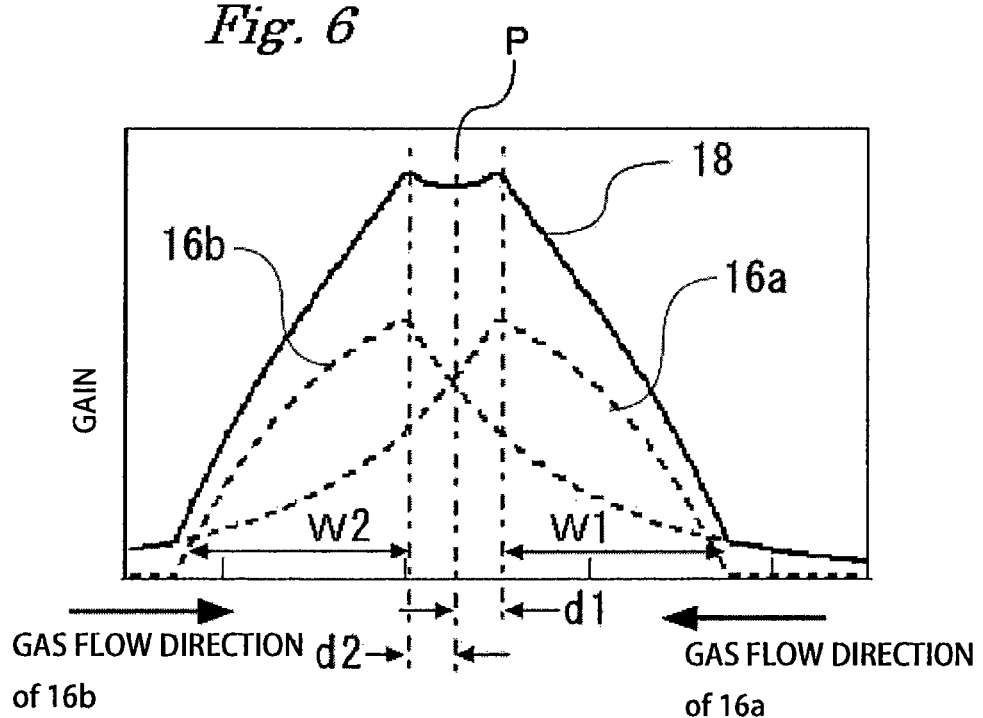
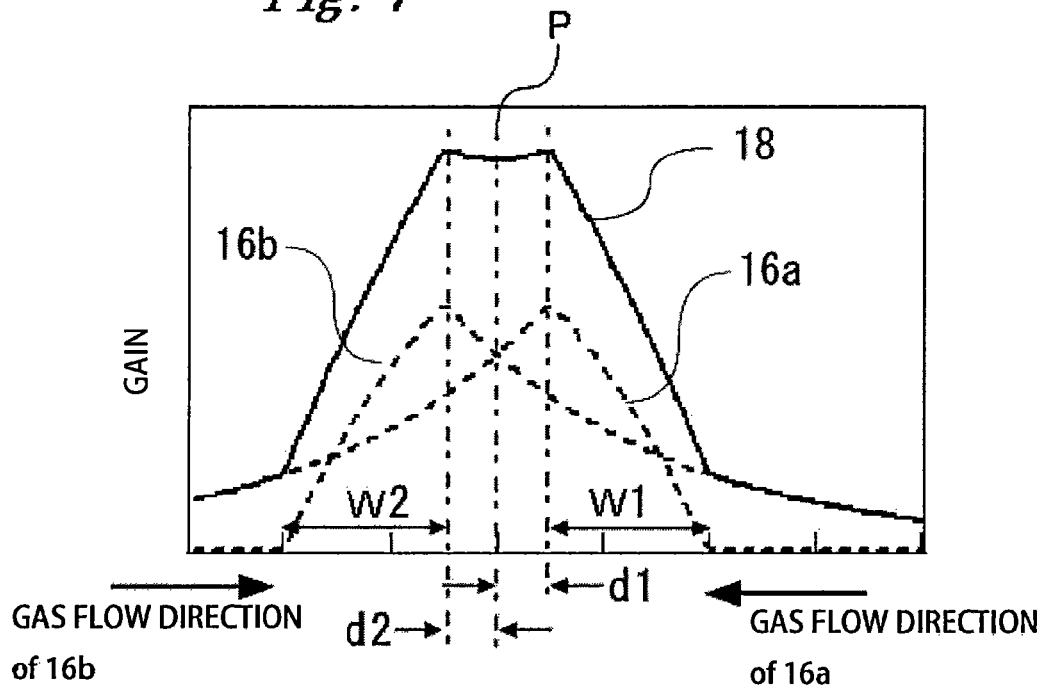

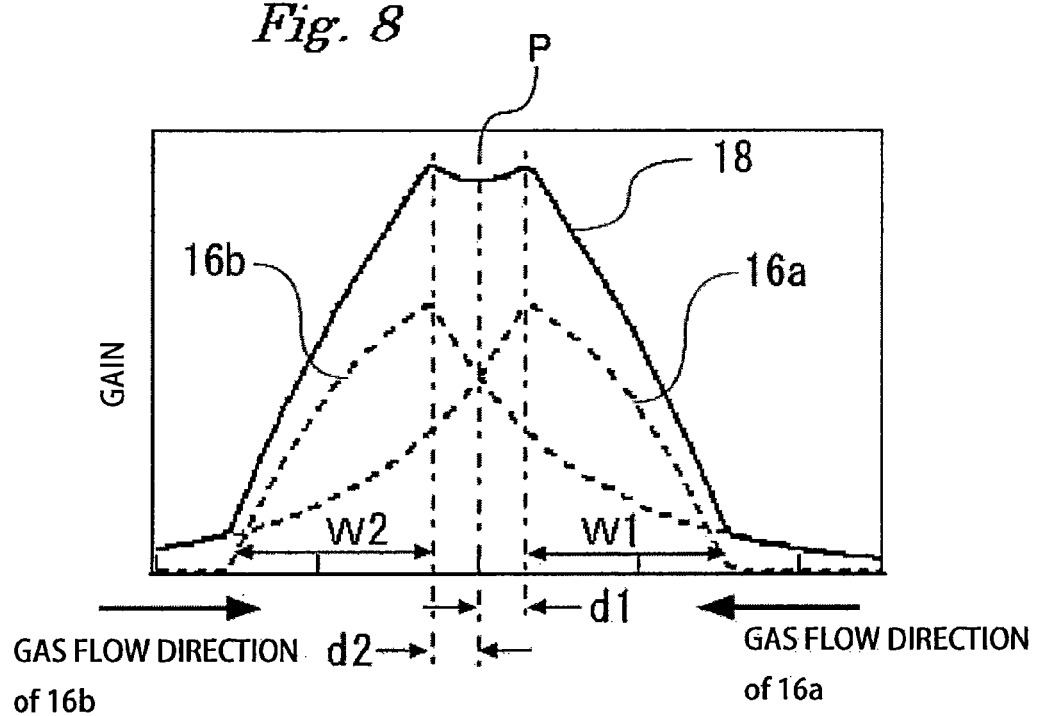
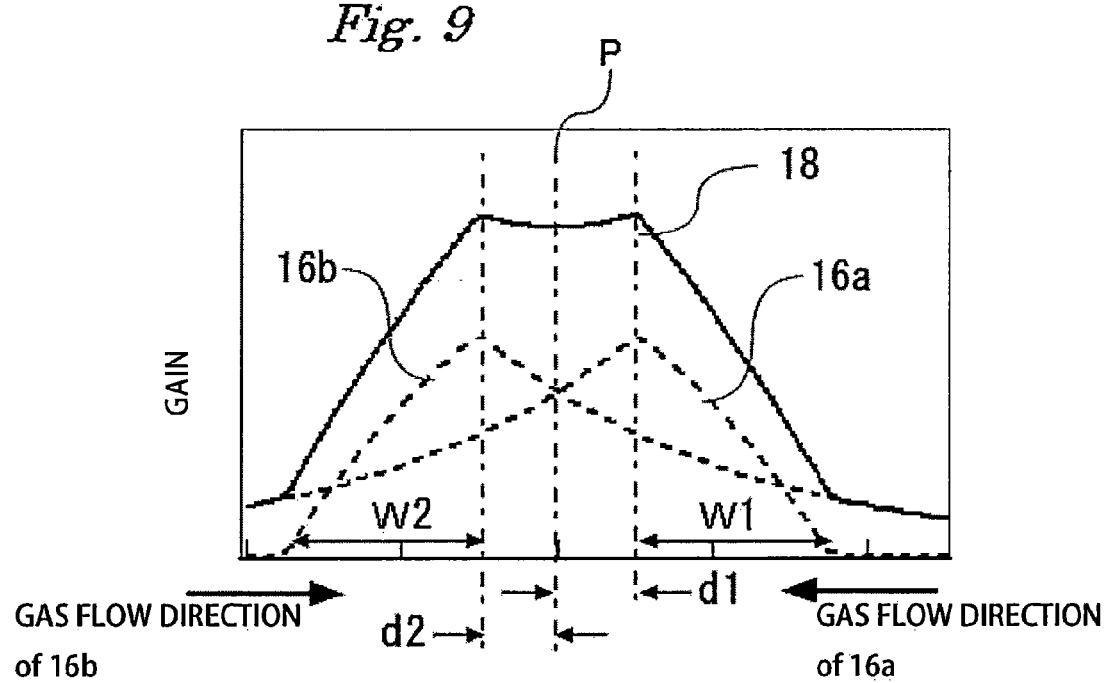

GAS LASER DEVICE

TECHNICAL FIELD

The present invention relates to a gas laser device, such as laser oscillator and laser amplifier.

BACKGROUND

FIG. 12 is a configuration view showing an example of a conventional gas laser device, and illustrates a tri-axially orthogonal $CO_2$ laser oscillator described in Patent Document 1. A laser gas is enclosed at a pressure of about tens Torrs inside the device. The laser gas is supplied into a discharge space 51 in the direction indicated by an arrow by means of a blower 52. When silent discharge occurs in the discharge space 51, $CO_2$ molecules are excited, so that the stimulated emission produces laser light in the direction perpendicular to the sheet. Here, a reflector 54 of a laser resonator is located so that a laser optical axis coincides with the gas downstream end of electrodes. The laser gas which has passed through the discharge space 51 is cooled in a heat exchanger 53.

FIG. 13 shows a relationship between a gain distribution and a position of discharge electrode in the tri-axially orthogonal $CO_2$ laser oscillator, which is described in detail in Non-Patent Document 1. When silent discharge occurs between cylindrical electrodes whose surfaces are coated with glass, the gain distribution is gradually increased from the gas upstream end of the electrodes, peaks at the gas downstream end thereof, and is gradually decreased along the gas downstream side. At this time, the optical axis of the resonator coincides with the vicinity of the gas downstream end of the electrodes at which the gain distribution peaks.

Such a gain distribution can be expressed by an exponential function, as shown by the following equation. Here, $X_D$ is an width of electrode, $\lambda$ is a relaxation rate at a higher level of laser, $v$ is a flow rate of laser gas, $\sigma$ is a cross section of stimulated emission, $\eta$ is an excitation efficiency, $w$ is a discharge power density, and X is a coordinate in direction of gas flow.

[Equation 1]

$$g_0(X) = \frac{\sigma \eta w}{\lambda}[1 - \exp(-\lambda X / v)] \quad 0 < X < X_D \quad (7)$$

$$g_0(X) = \frac{\sigma \eta w}{\lambda}[\exp(\lambda X_D / v) - 1] \times \exp(-\lambda X / V) \quad (8)$$

$$X_D < X$$

FIGS. 14A, 14B, and 14C show an example of asymmetrical beam mode distribution: FIG. 14A shows contour lines of a beam intensity distribution, in which the arrow indicates the direction of laser gas flow, and FIG. 14B shows the intensity distribution of a center cross-section in the horizontal direction, and FIG. 14C shows the intensity distribution of a center cross-section in the vertical direction. In the conventional gas laser device as disclosed in Patent Document 1 and Non-Patent Document 1, the optical axis of the resonator is set at the peak position of the gain distribution so that the highest oscillation efficiency is achieved.

In the tri-axially orthogonal laser oscillator, as shown in FIG. 13, the gain distribution shows such an intensity distribution changed in the gas flow direction due to the presence of the gas flow. On the other hand, there is no gas flow in the direction of discharge gap length, exhibiting a substantially uniform gain distribution. That is, the gain distribution is different between in the gap length direction and in the gas flow direction. As shown in FIGS. 14A, 14B, and 14C, due to such anisotropy of the gain distribution, the intensity distribution of the outputted beam is asymmetrical between in the gap length direction and in the gas flow direction.

The discharge-excited laser, such as $CO_2$ laser, can produce a higher output as the discharge power is further increased. However, when the discharge power is too large, an arc discharge occurs so that the discharge is likely to be unstable. To solve this problem, the conventional tri-axially orthogonal laser oscillator adopts discharge electrodes each having a relatively large width of electrode so that the discharge power density cannot be too high. Therefore, the anisotropy of the gain distribution is not so great, so that the asymmetry of the intensity distribution of the laser beam does not matter much.

In recent years, the discharge control technique is improved so that stable discharge can be achieved even when the electrode width is reduced to increase the discharge power density. In addition, to increase the efficiency of the tri-axially orthogonal laser oscillator, it is effective to reduce the electrode width, but the anisotropy of the gain distribution is likely to occur. When the anisotropy of the gain distribution is great, the intensity distribution of the outputted laser beam is likely to be asymmetrical, as shown in FIGS. 14A, 14B, and 14C. In case such an asymmetrical laser beam is used for cutting, the anisotropy occurs on the cut surface of a workpiece, resulting in deteriorated cutting quality.

FIG. 15 is a plan view showing another example of a conventional tri-axially orthogonal $CO_2$ laser oscillator. FIG. 16 is a transverse sectional view of discharge electrodes. These drawings are described in Patent Document 2. A laser gas is supplied to a discharge region 66 located between electrodes 61A and 61B and between electrodes 62A and 62B. A rear mirror 63 and an output mirror 64 of an optical resonator are opposite to each other so as to flow the laser gas therebetween. A laser beam LB is amplified in an optical cavity 65 defined by the rear mirror 63 and the output mirror 64. Then, a part of amplified laser beam LB is outputted from the output mirror 64. Here, two sets of electrodes 61A and 61B and electrodes 62A and 62B are each shifted in the gas flow direction so as to be located in different positions with respect to the optical cavity 65, thereby achieving a uniform gain distribution.

FIG. 17 is a graph showing a relationship between the gain of the laser gas excited when it passes through the optical cavity 65 and the position in the optical path of the resonator. This exemplifies a case wherein three sets of discharge electrodes are each shifted to different positions with respect to the resonator's optical path. The laser gas excited by the first discharge electrodes in the position farthest from the resonator's optical path shows a gain curve 67 having a peak P1 on the gas upstream side. The laser gas excited by the third discharge electrodes in the position closest to the resonator's optical path shows a gain curve 69 having a peak P3 on the gas downstream side. The laser gas excited by the second discharge electrodes located between the first discharge electrodes and the third discharge electrodes shows a gain curve 68 having a peak P2 between the peaks P1 and P3. Therefore, the overlap of the three gain curves 67 to 69 can obtain a gain curve 70 showing a substantially uniform gain distribution in the cross section of the resonator's optical path.

PRIOR ART DOCUMENT

Patent Document

Patent Document 1: JU 6-45359 A
Patent Document 2: JP 3810459 B

Patent Document 3: JP 2862058 B
Patent Document 4: JP 60-28288 A

Non-Patent Document

Non-Patent Document 1: J. Phys. D: Appl. Phys. 22 (1989) 1835-1839

SUMMARY OF THE INVENTION

Problem to be Solved by the Invention

As disclosed in Patent Document 2, although the plurality of electrodes are shifted in the gas flow direction, when there is a change in various parameters such as gas pressure, gas flow rate, electrode width, overlapping interval, and the number of overlaps, the gain distribution is not always uniform. An example thereof will be shown below.

FIGS. 18 and 19 are graphs showing examples of gain distributions when there is a change in gas flow rate in a state where two sets of electrodes are shifted. A curve 71 shows the gain distribution of laser gas excited by the first electrodes on the gas upstream side. A curve 72 shows the gain distribution of laser gas excited by the second electrodes on the gas downstream side. A curve 73 shows a total gain distribution obtained by overlapping the curves 71 and 72. In FIG. 18, $\theta 1$ is an inclination of the gain changed from the peak of the curve 71 to the upstream side, and $\theta 2$ is an inclination of the gain changed from the peak of the curve 71 to the downstream side.

In FIG. 18, a substantially uniform gain distribution can be obtained in an intermediate region in a state where two sets of electrodes are shifted as disclosed in Patent Document 2. On the other hand, in FIG. 19, a gas flow rate is higher than that shown in FIG. 18, and the gain curves 71 and 72 are extended in the gas flow direction. As a result, the gain distribution is inclined and cannot be uniform in the intermediate region.

FIG. 20 is a graph showing an example of a gain distribution when a gas flow rate is lower than that shown in FIG. 18. In this case, the gain curves 71 and 72 are contracted in the gas flow direction. As a result, the gain distribution is also inclined and cannot be uniform in the intermediate region.

FIG. 21 is a graph showing an example of a gain distribution when an electrode width is smaller than that shown in FIG. 18. In this case, the gain curves 71 and 72 are shifted away from each other. As a result, the gain distribution is also inclined and cannot be uniform in the intermediate region.

FIG. 22 is a graph showing an example of a gain distribution when a laser gas pressure is higher than that shown in FIG. 18. In this case, the inclinations of the gain curves 71 and 72 are increased. As a result, the gain distribution is also inclined and cannot be uniform in the intermediate region.

FIG. 23 is a graph showing an example of a gain distribution when an interval between the first electrodes and the second electrodes is larger than that shown in FIG. 18. In this case, the gain curves 71 and 72 are shifted away from each other to be extended in the gas flow direction. As a result, the gain distribution is also inclined and cannot be uniform in the intermediate region.

Incidentally, for simplification, FIGS. 18 to 23 exemplify cases where two sets of electrodes are used. However, even where three or more sets of electrodes are shifted, it is considerably limited that a uniform gain distribution can be obtained.

When the gain curve 71 of the first electrodes and the gain curve 72 of the second electrodes are substantially symmetrical with respect to the respective peaks, a uniform gain distribution can be obtained in the intermediate region between the electrodes. That is, as shown in FIG. 18, this occurs only when the inclination $\theta 1$ on the peak upstream side is substantially equal to the inclination $\theta 2$ on the peak downstream side. For example, as shown in FIG. 19, when the gas flow rate is increased, the inclination $\theta 2$ on the peak downstream side is smaller than the inclination $\theta 1$ on the peak upstream side. In case where the gas flow rate is changed to be higher for improving the efficiency of the laser oscillator, unless other parameters, such as gas flow rate, gas pressure, electrode width, and electrode position, are also changed at the same time, it is difficult to achieve a uniform gain distribution.

In the method of Patent Document 2, it is considerably limited that a uniform gain distribution can be obtained. When there is a change in any one of parameters, such as gas pressure, gas flow rate, electrode width, overlapping interval, and the number of overlaps, a uniform gain distribution cannot be obtained. Therefore, the laser oscillator has lowered the freedom of design, which is considerably difficult to be actually adopted. In addition, once there is a change in gas pressure or gas flow rate during the operation of the device even with a uniform gain distribution achieved at the design stage, a uniform gain distribution cannot be obtained. As a result, the outputted laser beam is asymmetrical. When the laser beam is used for cutting, anisotropy occurs on the cut surface of a workpiece, resulting in deteriorated cutting quality.

It is an object of the present invention to provide a gas laser device which can stably achieve a uniform gain distribution even when there is a change in parameters, such as gas flow rate, gas pressure, electrode width, and electrode position.

Means for Solving the Problem

To achieve the above object, in one aspect of the present invention, there is provided a tri-axially orthogonal gas laser device in which an optical axis of an optical resonator, a direction in which a laser gas is supplied into the optical resonator, and a direction of discharge for exciting the laser gas are mutually orthogonal to one another, the device including:

a first exciting unit including a first gas supply mechanism for supplying the laser gas in a first gas flow direction to the optical axis of the optical resonator, and a first discharge electrode pair which is shifted on an upstream side of the first gas flow direction with respect to the optical axis; and a second exciting unit including a second gas supply mechanism for supplying the laser gas in a second gas flow direction opposite to the first gas flow direction to the optical axis of the optical resonator, and a second discharge electrode pair which is shifted on an upstream side of the second gas flow direction with respect to the optical axis;

wherein in the first discharge electrode pair and the second discharge electrode pair, the upper and lower electrodes of the respective electrode pairs have the same width in the gas flow direction, and the electrodes are so arranged that when observed in the direction of discharge, a distance between the optical axis of the optical resonator and the first discharge electrode pair is equal to a distance between the optical axis of the optical resonator and the second discharge electrode pair, and the electrode width of the first discharge electrode pair is equal to the electrode width of the second discharge electrode pair, thereby achieving a gain distribution of the laser gas symmetrical with respect to a plane which is perpendicular to the gas flow direction and includes the optical axis of the optical resonator, the gain distribution having two peaks of gain and a lower gain in the center portion thereof, and the optical resonator includes a plurality of mirrors including two folding mirrors, and a plurality of aperture members each having a circular opening for defining an optical path of a laser beam, the aperture member being located near the folding mirror, and a beam mode is produced so that an $M^2$ value is 1.8 to 3 and a peak of intensity distribution is torus-shaped in a plane flush with one of the circular openings near the two folding mirrors.

Effect of the Invention

According to the present invention, there are provided the first exciting unit and the second exciting unit in which the laser gas supply directions are opposite to each other with respect to the optical axis of the optical resonator, and the discharge electrode pairs are provided on the gas upstream side. Therefore, a uniform gain distribution can be stably achieved even when there is a change in parameters, such as gas flow rate, gas pressure, electrode width, and electrode position, so that the symmetry of the outputted laser beam can be improved.

BRIEF DESCRIPTION OF THE DRAWINGS

FIG. 6 is a graph showing an example of a gain distribution when the gas flow rate of the exciting units is lower than that shown in FIG. 4.

FIG. 7 is a graph showing an example of a gain distribution when an electrode width w of the exciting units is smaller than that shown in FIG. 4.

FIG. 8 is a graph showing an example of a gain distribution when a laser gas pressure of the exciting units is higher than that shown in FIG. 4.

FIG. 9 is a graph showing an example of a gain distribution when a distance d of the exciting units is larger than that shown in FIG. 4.

EMBODIMENT FOR CARRYING OUT THE INVENTION (Embodiment 1)

Figure 1:
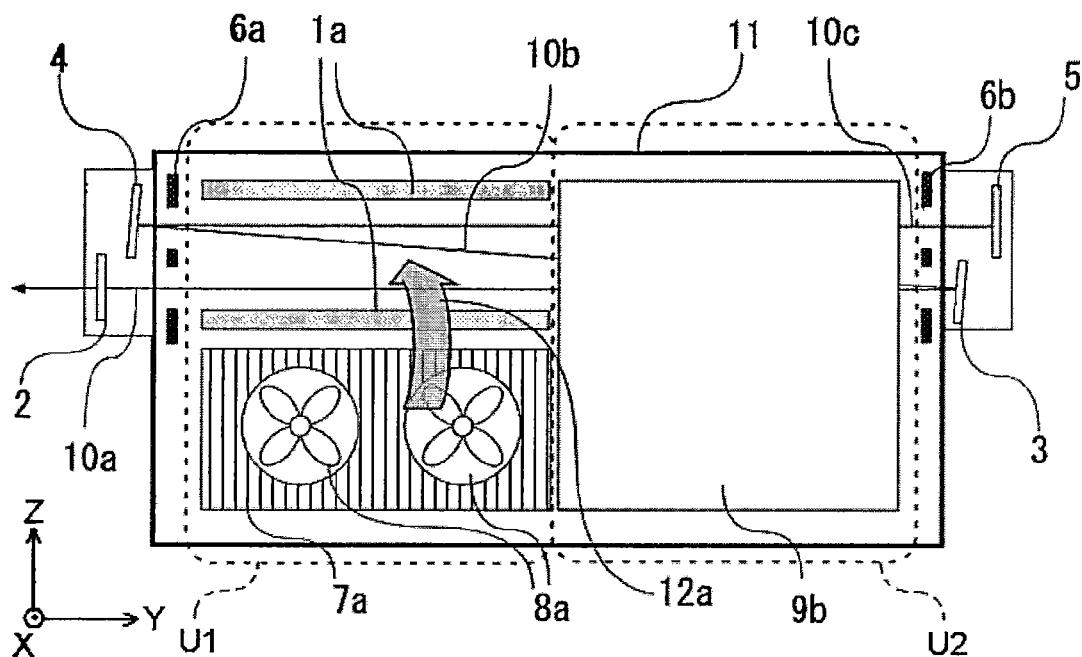
FIG. 1 is a front view showing Embodiment 1 of the present invention.
Figure 2:
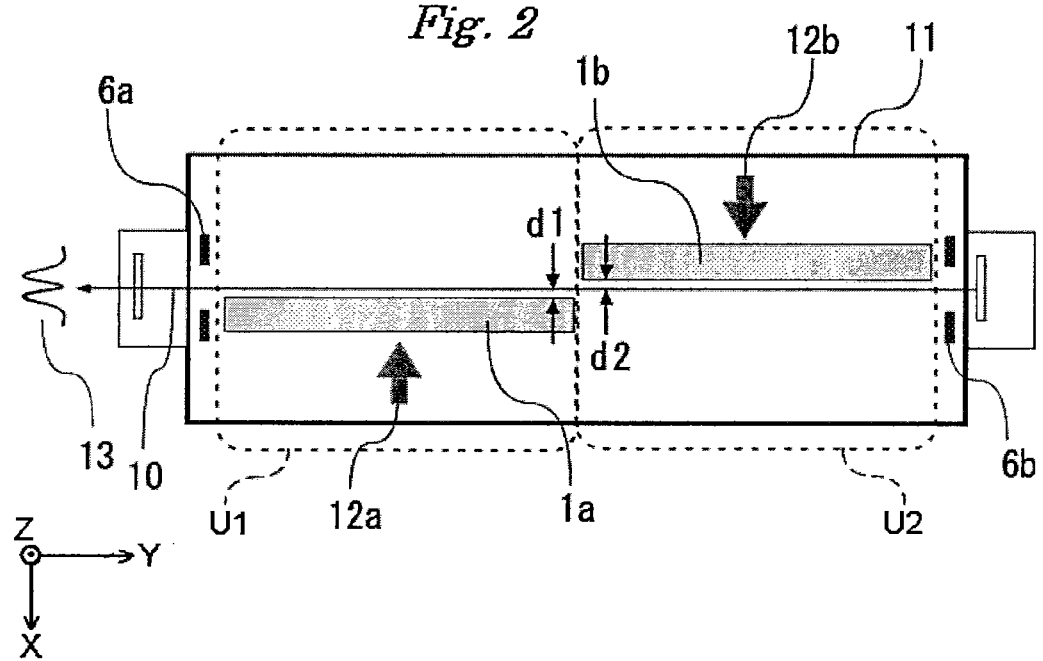
FIG. 2 is a plan view showing Embodiment 1 of the present invention.
Figure 3:
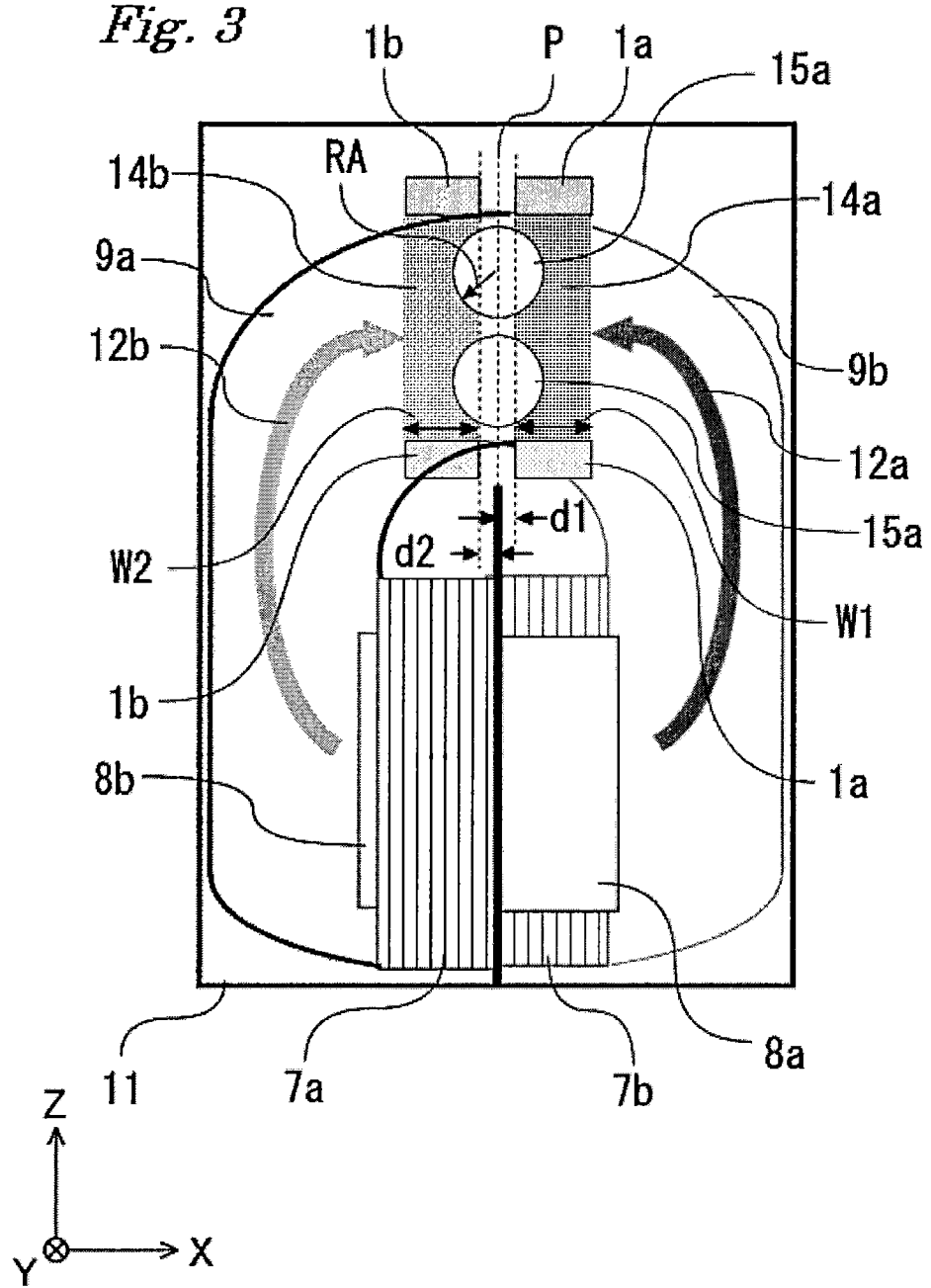
FIG. 3 is a side view showing Embodiment 1 of the present invention.

FIG. 1 is a front view showing Embodiment 1 of the present invention, FIG. 2 is a plan view thereof, and FIG. 3 is a side view thereof. A tri-axially orthogonal gas laser device includes an optical resonator having a partial reflection mirror 2, folding mirrors 3 and 4, and a total reflection mirror 5; a plurality of (herein, two) exciting units U1 and U2 provided along an optical axis of the optical resonator; and a housing 11 for shielding a laser gas from an ambient air. Here, for easy understanding, the optical axis direction of the optical resonator is defined as Y direction, a direction parallel to a direction in which laser gas is supplied to the optical resonator is defined as X direction, and a direction of discharge for exciting the laser gas is defined as Z direction.

In this embodiment, a Z-type resonator having three optical axes 10a, 10b, and 10c in YZ plane is used. However, other configurations, such as a Fabry-Perot resonator, a complex resonator, a ring resonator, a V-type resonator, a W-type resonator, and a U-shaped type resonator can also be used.

The partial reflection mirror 2 can function as an output mirror for extracting a part of a laser beam amplified in the optical resonator. The total reflection mirror 5 can function as a rear mirror for reflecting a laser beam amplified in the optical resonator with a low loss. The folding mirrors 3 and 4 are provided to fold the optical axis of the optical resonator, thereby downsizing the total device.

An aperture member 6a, which has a circular opening defining the optical path of the laser beam, is located near the partial reflection mirror 2 and the folding mirror 4. Likewise, an aperture member 6b, which has a circular opening defining the optical path of the laser beam, is located near the folding mirror 3 and the total reflection mirror 5.

The exciting unit U1 has a discharge electrode pair la, a heat exchanger 7a, a blower 8a, and a gas duct 9a. The discharge electrode pair 1a generates silent discharge in Z direction within a discharge space 14a between the electrodes, when an alternating voltage is applied thereto from a high-frequency power source (not shown). The blower 8a circulates the laser gas enclosed in the housing 11 in a direction 12a inside the gas duct 9a. Thereby, the laser gas is supplied in −X direction toward the discharge space 14a. The laser gas which has passed through the discharge space 14a is cooled in the heat exchanger 7a, and then returns back to the blower 8a.

The exciting unit U2 has components similar to those of the exciting unit U1. The exciting unit U2 has a discharge electrode pair 1b, a heat exchanger 7b, a blower 8b, and a gas duct 9b. For easy understanding, FIG. 1 shows the partially omitted exciting unit U2. The discharge electrode pair 1b generates silent discharge in Z direction within a discharge space 14b between the electrodes, when an alternating voltage is applied thereto from a high-frequency power source (not shown). The blower 8b circulates the laser gas enclosed in the housing 11 in a direction 12b inside the gas duct 9b. Thereby, the laser gas is supplied in +X direction toward the discharge space 14b. The laser gas which has passed through the discharge space 14b is cooled in the heat exchanger 7b, and then returns back to the blower 8b.

When molecules and atoms of the laser gas are excited to a higher level of laser by silent discharge, they can exhibit a function of optical amplification. For example, when a mixed gas containing $CO_2$ molecules is used for the laser gas, an oscillated laser beam having a wavelength of 10.6 μm is obtained by the transition between the oscillation levels of the $CO_2$ molecules. The laser beam outputted from the partial reflection mirror 2 typically has a beam mode which can be expressed by $TEM_{nm}$ (n and m are 0 or a positive integer). The beam mode can be controlled according to the gain distribution of the optical resonator and the opening shape of the aperture members 6a and 6b. FIG. 2 illustrates an intensity distribution 13 in a $TEM_{01}^*$ mode distributed in a torus shape about the optical axis.

In this embodiment, as shown in FIGS. 2 and 3, the discharge electrode pair 1a of the exciting unit U1 is shifted in +X direction on the laser gas upstream side with respect to the optical axis of the optical resonator. On the other hand, the discharge electrode pair 1b of the exciting unit U2 is shifted in −X direction on the laser gas upstream side with respect to the optical axis of the optical resonator.

In this way, the exciting units U1 and U2 are located symmetrically about the optical axis so that the laser gas supply directions are opposite to each other with respect to the optical axis of the optical resonator and that the discharge electrode pairs are each provided on the gas upstream side. The shapes of the gain distributions in the exciting units are thus related in a mirror image, so that a total gain distribution obtained by overlapping them is symmetrical. Therefore, even if there is a change in parameters, such as gas flow rate, gas pressure, electrode width, and electrode position, to change the shape of one of the gain distributions, the shape of the other gain distribution is also symmetrically changed. As a result, a uniform gain distribution can be stably achieved. The symmetry of the outputted laser beam can thus be improved. For example, when cutting is performed using the laser beam, the quality of the cutting surface can be improved.

Herein, when observed in the discharge direction (Z direction), d1 is a distance from YZ plane P including the optical axes 10a, 10b, and 10c to the discharge electrode pair 1a, and d2 is a distance from YZ plane P to the discharge electrode pair 1b. In addition, w1 is an electrode width of the discharge electrode pair 1a, w2 is an electrode width of the discharge electrode pair 1b, and RA is a radius of the circular openings of the aperture members 6a and 6b.

Figure 4:
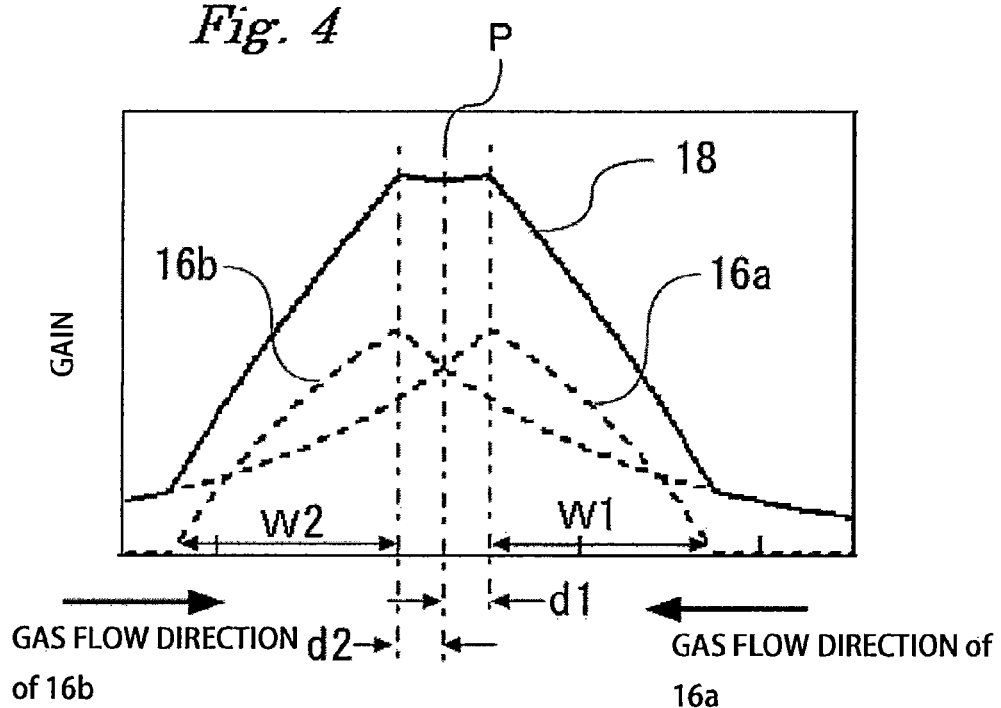
FIG. 4 is a graph showing an example of a gain distribution of a laser gas when exciting units are located symmetrically about an optical axis.

FIG. 4 is a graph showing an example of a gain distribution of the laser gas when the exciting units U1 and U2 are located symmetrically about the optical axis. A curve 16a shows a gain distribution of the laser gas excited by the discharge electrode pair 1a of the exciting unit U1. A curve 16b shows a gain distribution of the laser gas excited by the discharge electrode pair 1b of the exciting unit U2. A curve 18 shows a total gain distribution obtained by overlapping the curves 16a and 16b. The electrode width w1 of the exciting unit U1 is shifted by the distance d1 on the gas upstream side with respect to YZ plane P, so that the gas downstream end of the electrode width w1 coincide with the peak of the curve 16a. The electrode width w2 of the exciting unit U2 is shifted by the distance d2 on the gas upstream side with respect to YZ plane P, so that the gas downstream end of the electrode width w2 coincide with the peak of the curve 16b.

Here, it is preferably set that d1=d2(=d) and w1=w2(=w). Thereby, the curves 16a and 16b are related in a mirror image with respect to YZ plane P, so that the curve 18 obtained by overlapping them is symmetrical. Therefore, a substantially uniform gain distribution can be achieved in the intermediate region including the optical axis.

Figure 5:
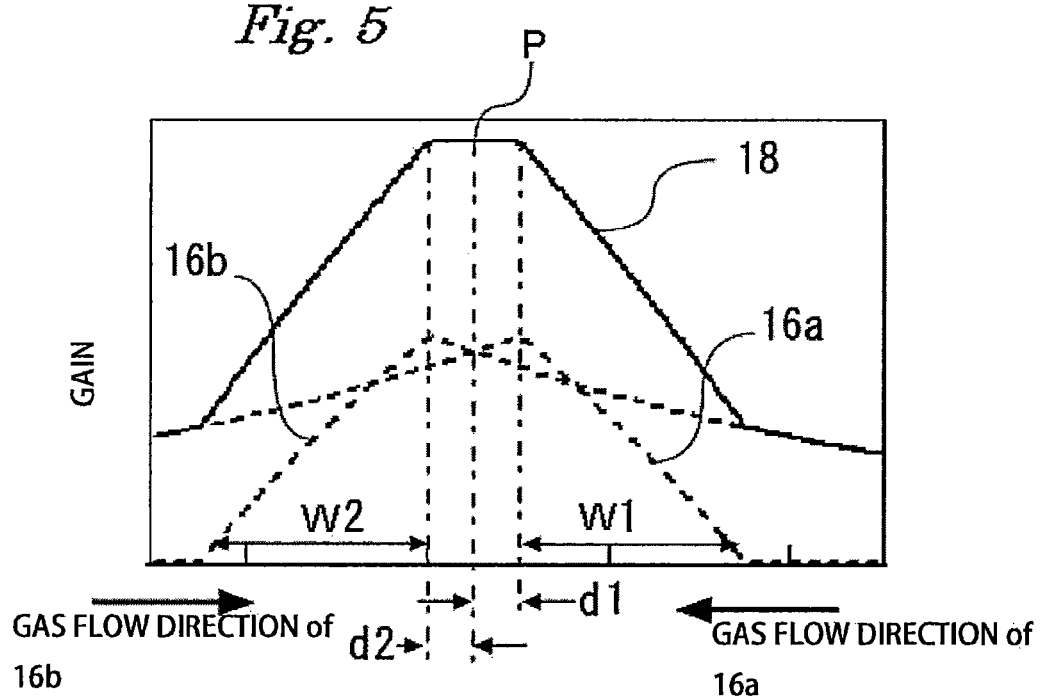
FIG. 5 is a graph showing an example of a gain distribution when the gas flow rate of the exciting units is higher than that shown in FIG. 4.

FIG. 5 is a graph showing an example of a gain distribution when the gas flow rate of the exciting units U1 and U2 is higher than that shown in FIG. 4. In this case, each of the gain curves 16a and 16b are extended in the gas flow direction, but the curve 18 obtained by overlapping them is symmetrical. Therefore, a substantially uniform gain distribution can be achieved in the intermediate region including the optical axis.

FIG. 6 is a graph showing an example of a gain distribution when the gas flow rate of the exciting units U1 and U2 is lower than that shown in FIG. 4. In this case, each of the gain curves 16a and 16b are contracted in the gas flow direction, but the curve 18 obtained by overlapping them is symmetrical. Therefore, a substantially uniform gain distribution can be achieved in the intermediate region including the optical axis.

FIG. 7 is a graph showing an example of a gain distribution when the electrode width w of the exciting units U1 and U2 is smaller than that shown in FIG. 4. In this case, the half-value width of each of the gain curves 16a and 16b becomes small, but the curve 18 obtained by overlapping them is symmetrical. Therefore, a substantially uniform gain distribution can be achieved in the intermediate region including the optical axis.

Figure 22:
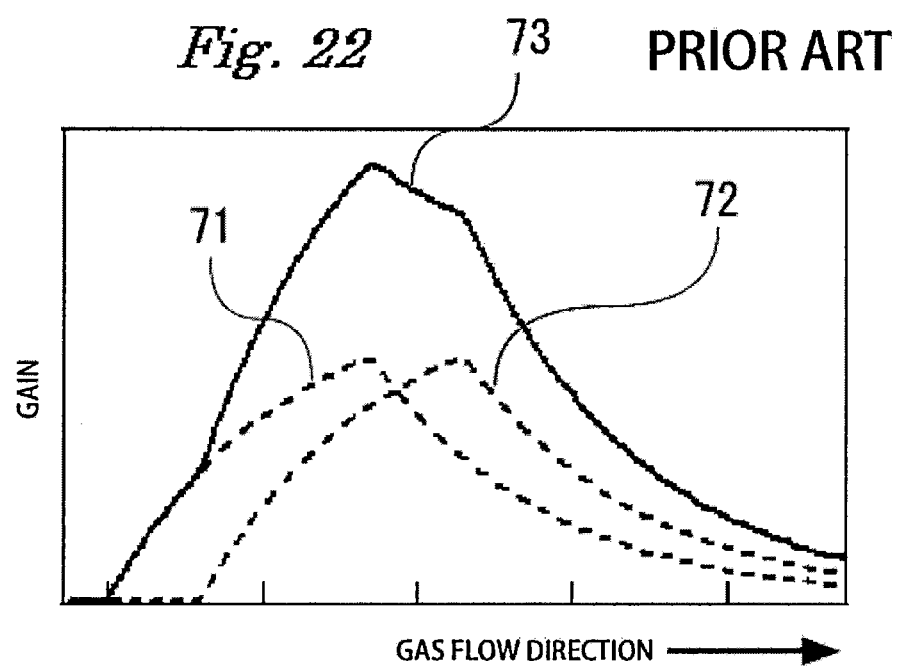
FIG. 22 is a graph showing an example of a gain distribution when a laser gas pressure is higher than that shown in FIG. 18.

FIG. 8 is a graph showing an example of a gain distribution when the laser gas pressure of the exciting units U1 and U2 is higher than that shown in FIG. 4. In this case, the inclination of each of the gain curves 16a and 16b is increased, but the curve 18 obtained by overlapping them is symmetrical. Therefore, a substantially uniform gain distribution can be achieved in the intermediate region including the optical axis. As the laser gas pressure is further increased, the uniformity of the gain distribution is slightly lowered. However, as compared with the gain distribution of the conventional asymmetrical arrangement (e.g., FIG. 22), the uniformity of the gain distribution can be improved. The symmetry of the produced laser beam shape can thus be improved.

Figure 23:
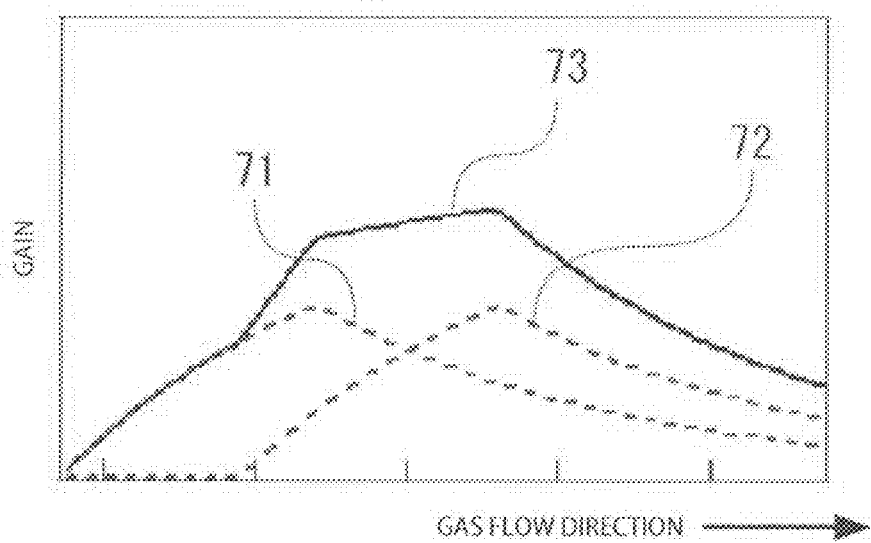
FIG. 23 is a graph showing an example of a gain distribution when an interval between first electrodes and second electrodes is larger than that shown in FIG. 18.

FIG. 9 is a graph showing an example of a gain distribution when the distance d of the exciting units U1 and U2 is larger than that shown in FIG. 4. In this case, the gain curves 16a and 16b are shifted away from each other, but the curve 18 obtained by overlapping them is symmetrical. Therefore, a substantially uniform gain distribution can be achieved in the intermediate region including the optical axis. As the distance d is further increased, the uniformity of the gain distribution is slightly lowered. However, as compared with the gain distribution of the conventional asymmetrical arrangement (e.g., FIG. 23), the uniformity of the gain distribution can be improved. The symmetry of the produced laser beam shape can thus be improved.

In this way, the two exciting units U1 and U2 are located symmetrically about the optical axis so that the total gain distribution obtained by overlapping the gain distributions of the respective exciting units is symmetrical. Therefore, even when there is a change in parameters, such as gas flow rate, gas pressure, electrode width, and electrode position, a uniform gain distribution can be stably achieved. The symmetry of the outputted laser beam can thus be improved.

The above description exemplifies that the two exciting units U1 and U2 are located symmetrically about the optical axis. However, even when two or more exciting units U1 and two or more exciting units U2 are alternately arranged along the optical axis, the same effect can be obtained.

Next, the circular openings of the aperture members 6a and 6b will be described below. To ensure the symmetry of the laser beam, a uniform gain distribution is preferably obtained in a passing area of the laser beam. Therefore, the distance d from YZ plane P including the optical axes of the optical resonator to the discharge electrode pairs 1a and 1b and the radius RA of the circular openings of the aperture members 6a and 6b preferably satisfy an inequality of RA≤d.

For example, in the tri-axially orthogonal $CO_2$ laser device, the aperture radius RA is typically set to about 5 mm to 15 mm. Therefore, the distance d is preferably set to 5 mm≤d≤15 mm while holding an inequality of RA≤d. The commercially available partial reflection mirror 2 for $CO_2$ laser typically has a largest diameter up to ϕ2 inches, so that the diameter of the laser beam is also typically set to 2 inches or less.

(Embodiment 2)

Figure 10A:
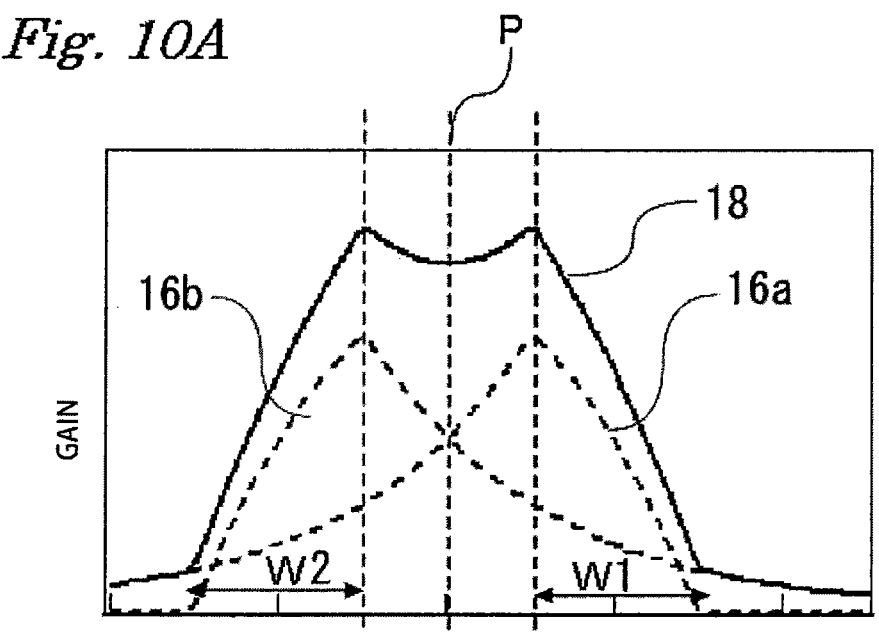
FIGS. 10A and 10B are explanatory views showing a relationship among a gain distribution, a beam mode shape, and positions of apertures of a tri-axially orthogonal gas laser device according to Embodiment 2 of the present invention.
Figure 10B:
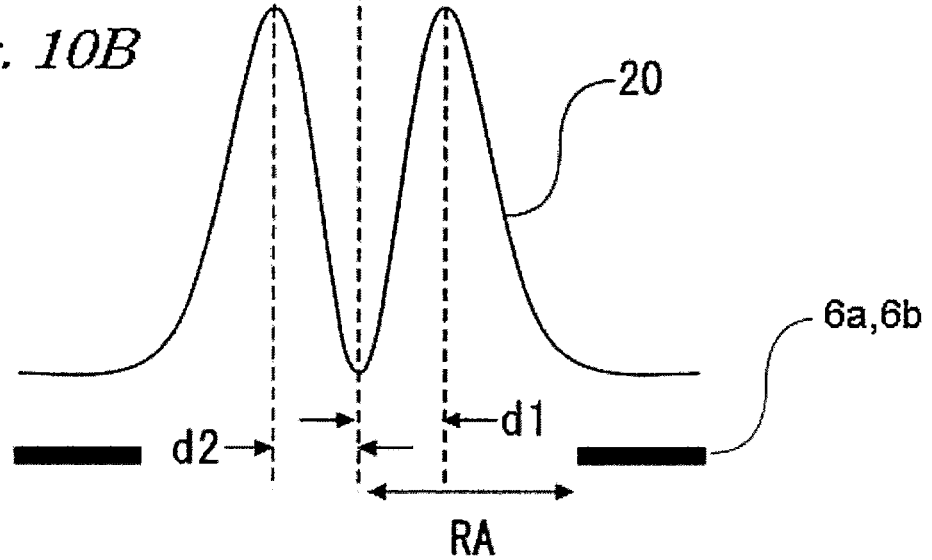

FIGS. 10A and 10B are explanatory views showing a relationship among a gain distribution, a beam mode shape, and the positions of the apertures of a tri-axially orthogonal gas laser device according to Embodiment 2 of the present invention. The tri-axially orthogonal gas laser device has the same configuration as that shown in FIGS. 1 to 3. Two exciting units U1 and U2 are located symmetrically about the optical axis so that the laser gas supply directions are opposite to each other with respect to the optical axis of the optical resonator and that the discharge electrode pairs are provided on the gas upstream side.

When the aperture members 6a and 6b have the circular opening having radius RA, an intensity distribution 20 of the laser beam outputted from the laser device preferably has a mode distributed in a torus shape about the optical axis, such as the $TEM_{01}^*$ mode as shown in FIG. 10B. The $TEM_{01}^*$ mode can be typically expressed by the following equation. Herein, w is a beam radius of fundamental mode, r is a radial distance, and $I_0$ is a constant. In the $TEM_{01}^*$ mode, an $M^2$ value showing beam quality is 2.

$$I = I_0 \cdot \left(\frac{2r^2}{w^2}\right) \cdot \exp\left(-\frac{2r^2}{w^2}\right) \quad \text{[Equation 2]}$$

FIG. 10A exemplifies that the uniformity of the total gain distribution obtained by the two exciting units U1 and U2 is slightly lowered due to a change in parameters, such as gas pressure and gas flow rate. Herein, the distances d1 and d2 are set such that the gas downstream ends of the discharge electrode pairs 1a and 1b coincide with the peak positions of the gain distribution curves 16a and 16b.

In order to efficiently oscillate a laser beam having a desired beam mode shape, a portion indicating a strong intensity distribution of the beam mode preferably coincides with a portion indicating a large gain of the laser gas. In the $TEM_{01}^*$ mode shown in FIG. 10B, the peak of intensity is distributed, not at the center of the laser beam, but in a torus shape about the optical axis.

In this embodiment, the distances d1 and d2 are set such that the peak positions of the total gain distribution obtained by the two exciting units U1 and U2 coincide with the peak position in the $TEM_{01}^*$ mode. Thus, the laser beam having the $TEM_{01}^*$ mode is efficiently oscillated. In this case, even when the uniformity of the gain distribution is lowered due to a change in parameters, such as gas pressure and gas flow rate, the selectivity of the beam mode shape becomes better since the peak position of the gain distribution and the peak position of the beam mode coincide with each other.

Figure 24:
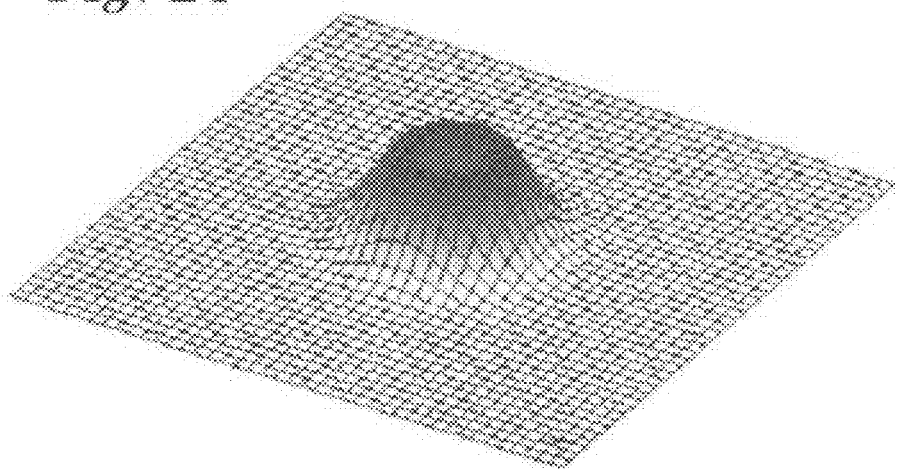
FIG. 24 is a bird's eye view showing a beam mode in which an $M^2$ value is about 1.8.
Figure 25:
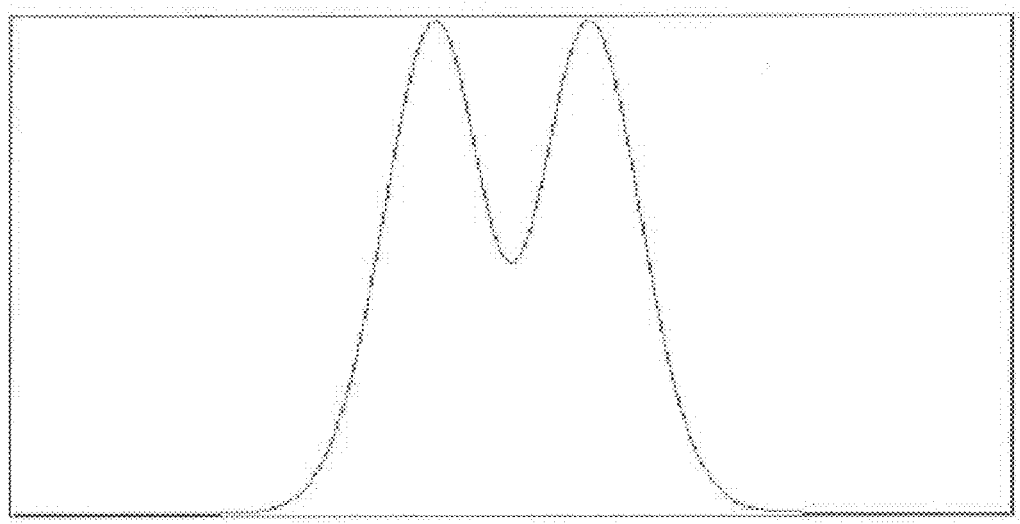
FIG. 25 is a cross-sectional view corresponding to the beam mode of FIG. 24.
Figure 26:
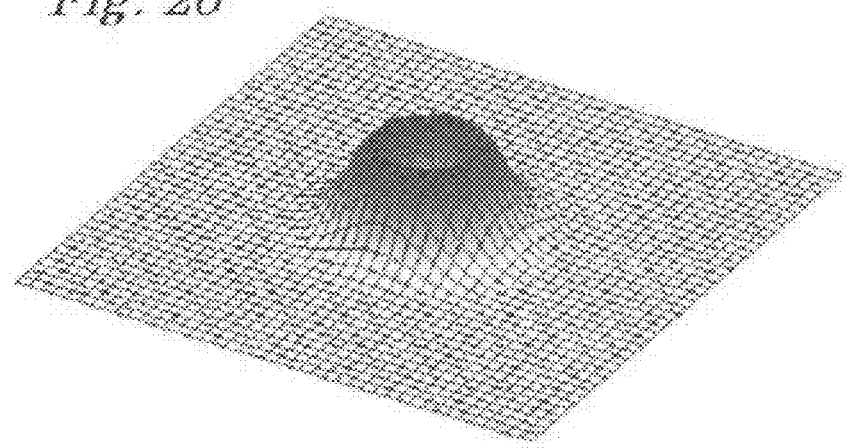
FIG. 26 is a bird's eye view showing a beam mode in which an $M^2$ value is about 2.
Figure 27:
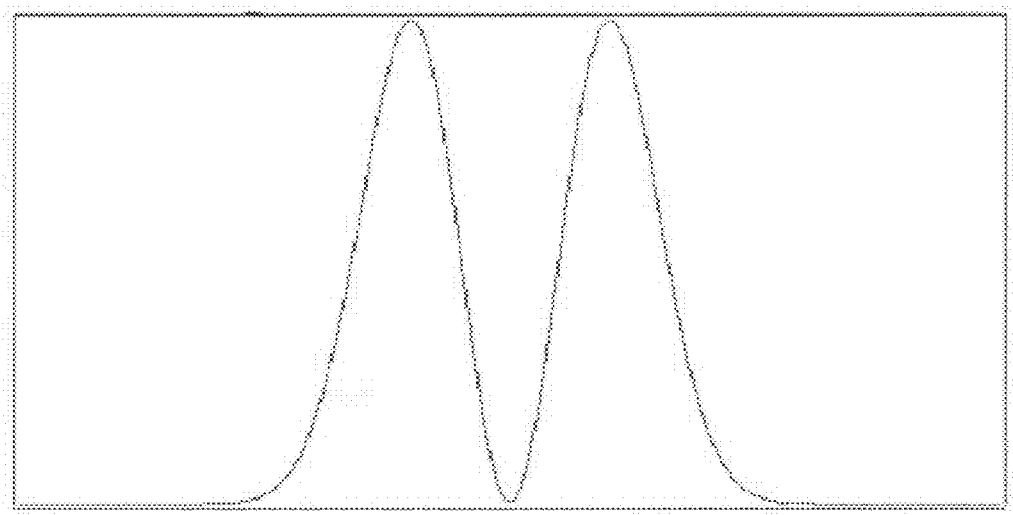
FIG. 27 is a cross-sectional view corresponding to the beam mode of FIG. 26.
Figure 28:
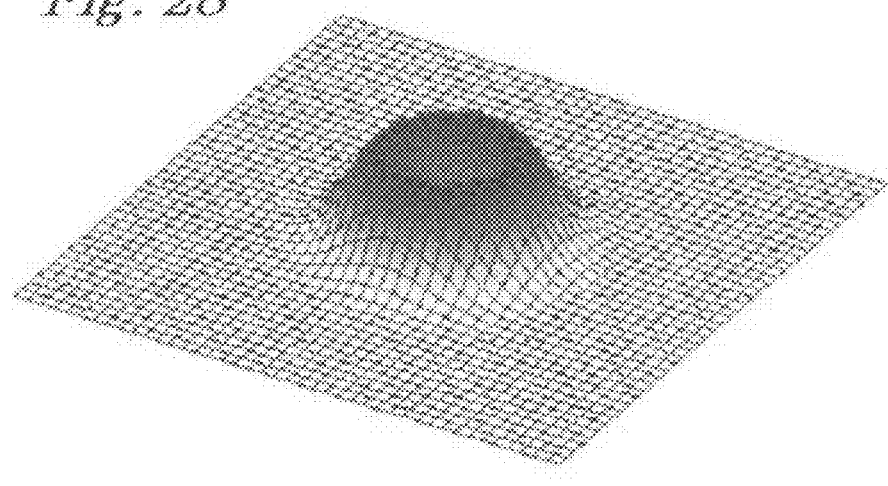
FIG. 28 is a bird's eye view showing a beam mode in which an $M^2$ value is about 2.5.
Figure 29:
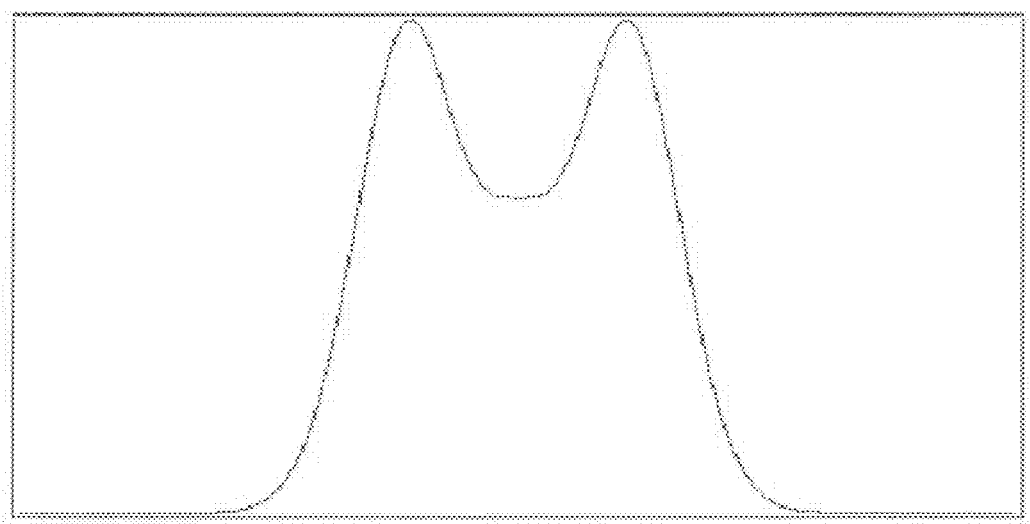
FIG. 29 is a cross-sectional view corresponding to the beam mode of FIG. 28.
Figure 30:
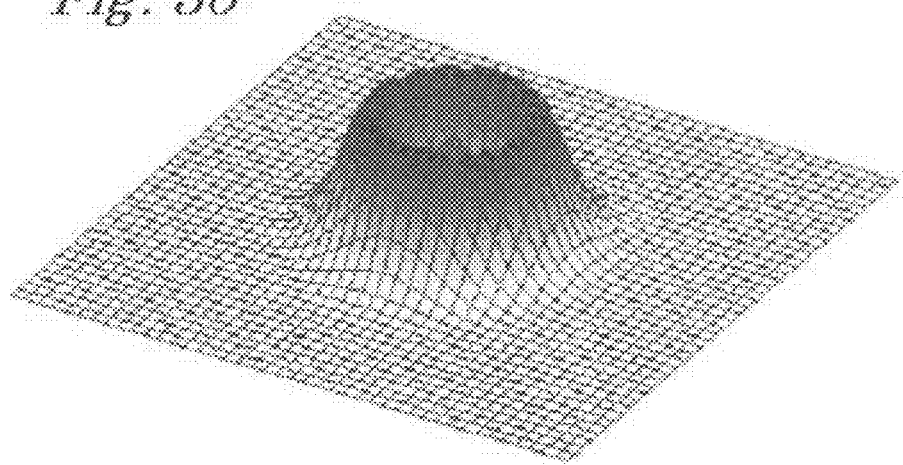
FIG. 30 is a bird's eye view showing a beam mode in which an $M^2$ value is about 3.
Figure 31:
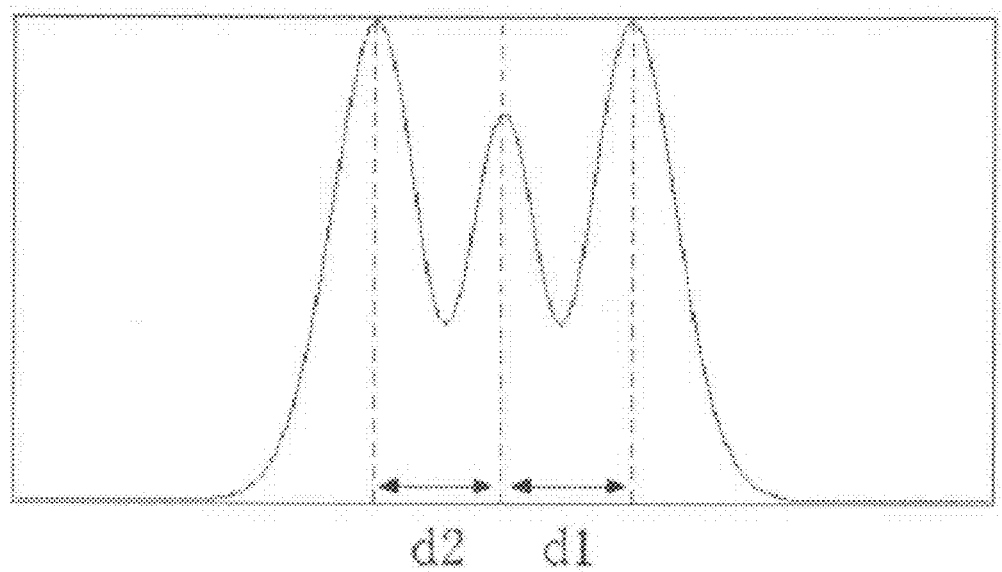
FIG. 31 is a cross-sectional view corresponding to the beam mode of FIG. 30.
Figure 32:
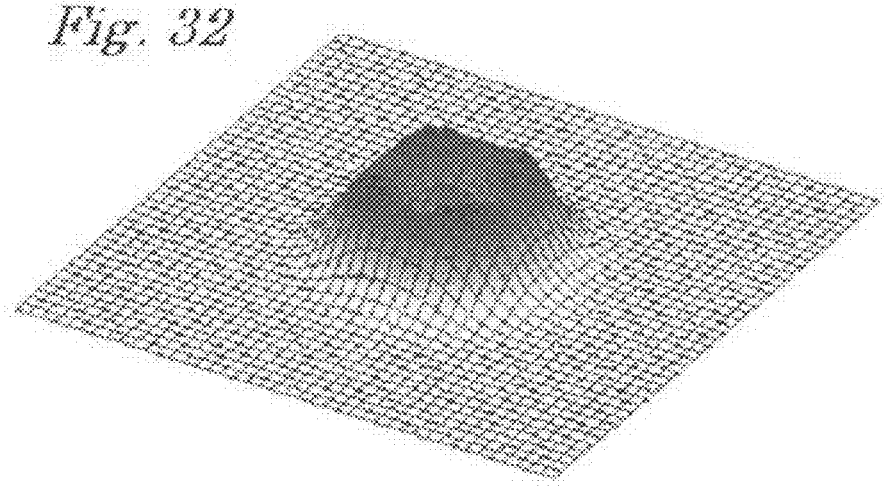
FIG. 32 is a bird's eye view showing a beam mode in which an $M^2$ value is about 2.5 to 3.
Figure 33:
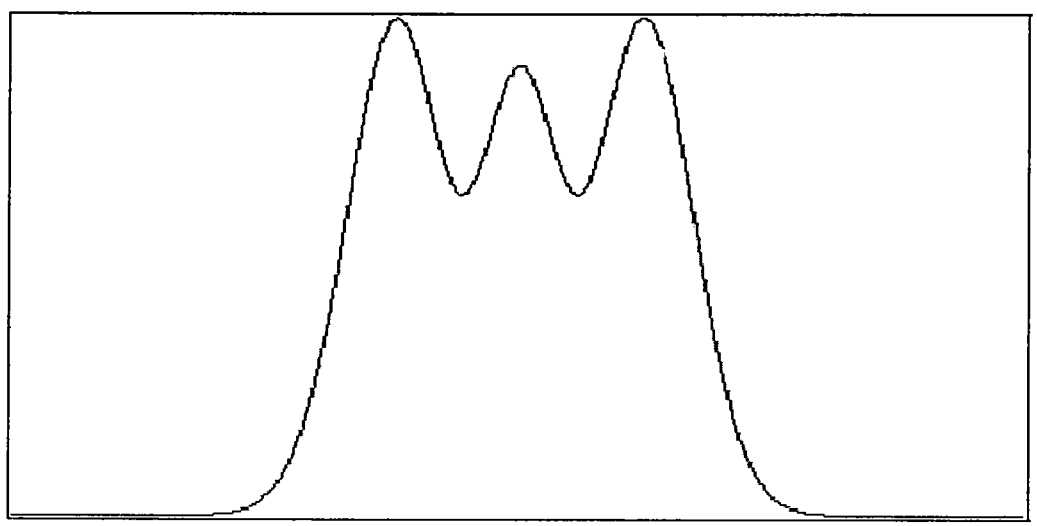
FIG. 33 is a cross-sectional view corresponding to the beam mode of FIG. 32.

In a case a thin material is cut at a high speed in laser cutting of soft steel and stainless steel, the $M^2$ value showing laser beam quality is preferably small, and the gas downstream end of the discharge electrodes typically coincides with the optical axis so as to set a position showing the highest gain distribution in the center of the beam. In another case a thick material having a thickness of e.g., 6 mm or more, is cut, in laser cutting of soft steel and stainless steel, a cutting kerf is required to have a width of some extent to allow an assist gas to sufficiently reach the back side of the material. In this case, it is preferable that convergence of the laser beam is relatively low, and the $M^2$ value showing beam quality is about 1.8 to 3. For example, FIGS. 24 and 25 are a bird's eye view of a beam mode in which the $M^2$ value is about 1.8 and a cross-sectional view thereof, FIGS. 26 and 27 are a bird's eye view of a beam mode in which the $M^2$ value is 2 and a cross-sectional view thereof, FIGS. 28 and 29 are a bird's eye view of a beam mode in which the $M^2$ value is about 2.5 and a cross-sectional view thereof, and FIGS. 30 and 31 are a bird's eye view of a beam mode in which the $M^2$ value is about 3 and a cross-sectional view thereof. In addition, FIGS. 32 and 33 are a bird's eye view of a beam having an intensity distribution showing a torus-shaped peak in which the $M^2$ value is about 2.5 to 3 and a cross-sectional view thereof.

Figure 14:
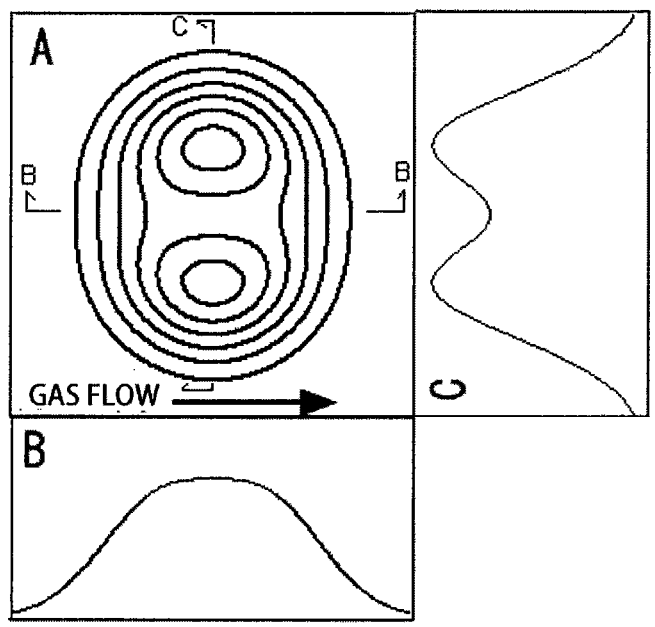
FIGS. 14A, 14B, and 14C show an example of asymmetrical beam mode distribution.
Figure 15:
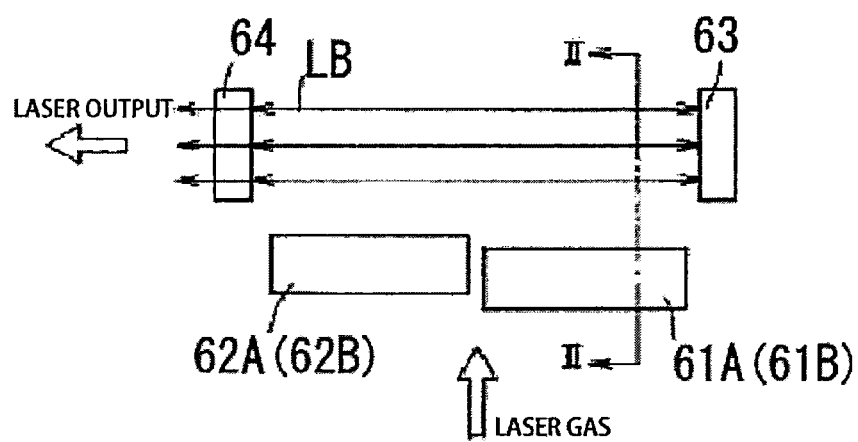
FIG. 15 is a plan view showing another example of a conventional tri-axially orthogonal $CO_2$ laser oscillator.
Figure 16:
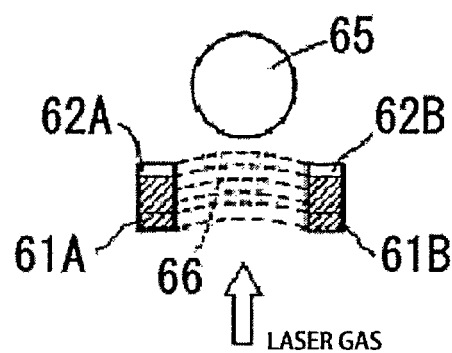
FIG. 16 is a transverse sectional view of discharge electrodes.
Figure 17:
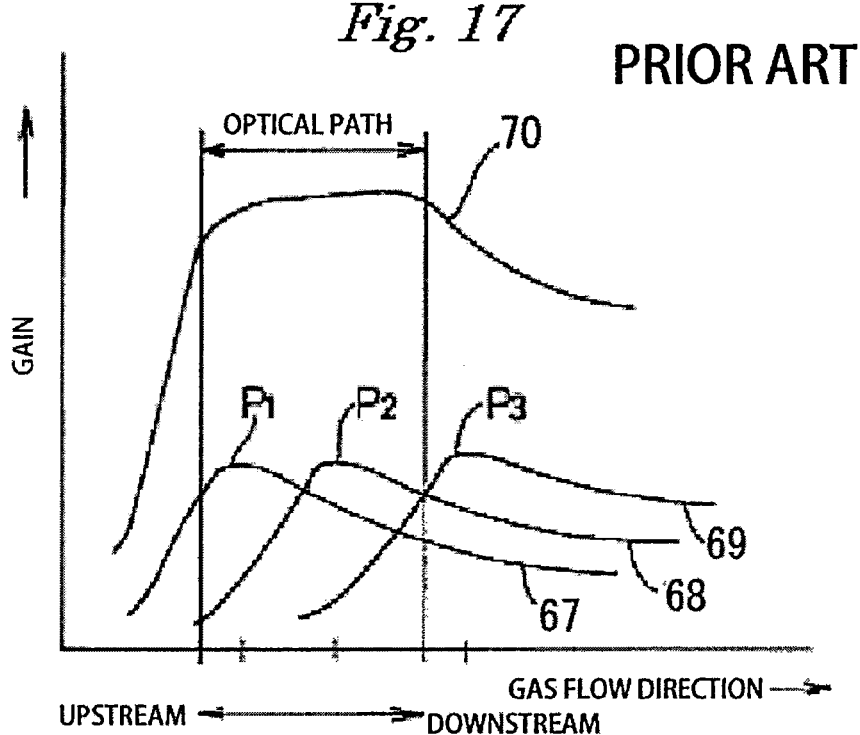
FIG. 17 is a graph showing a relationship between the gain of the laser gas excited when it passes through an optical cavity and the position in the optical path of the resonator.
Figure 18:
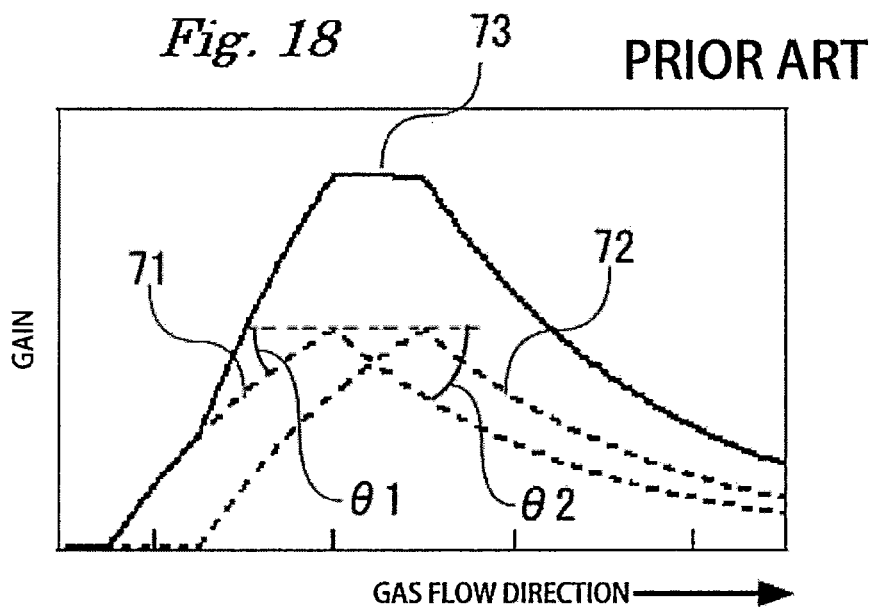
FIG. 18 is a graph showing an example of a gain distribution when there is a change in gas flow rate in a state where two sets of electrodes are shifted.
Figure 19:
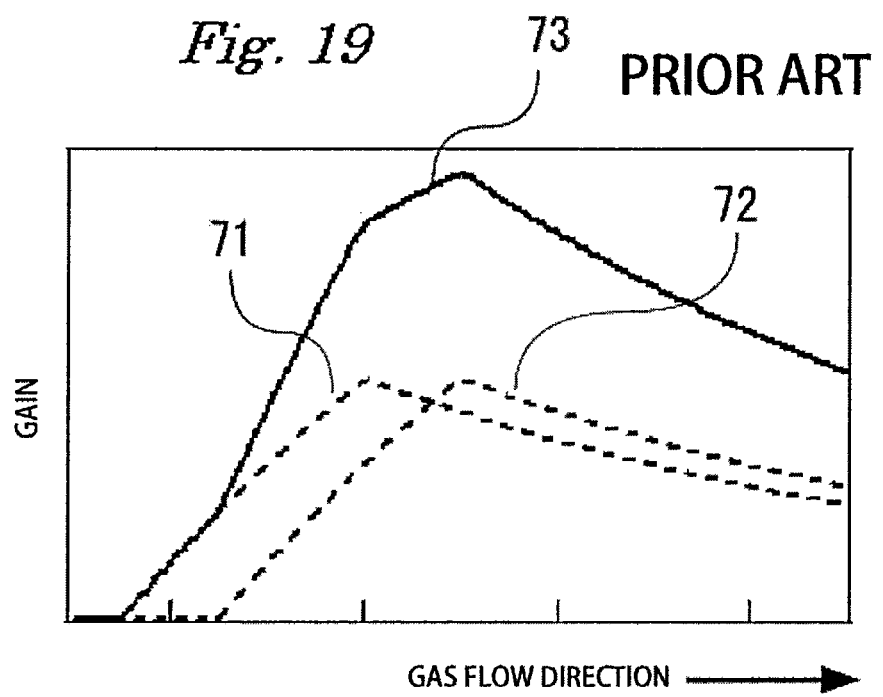
FIG. 19 is a graph showing an example of a gain distribution when a gas flow rate is higher than that shown in FIG. 18.
Figure 20:
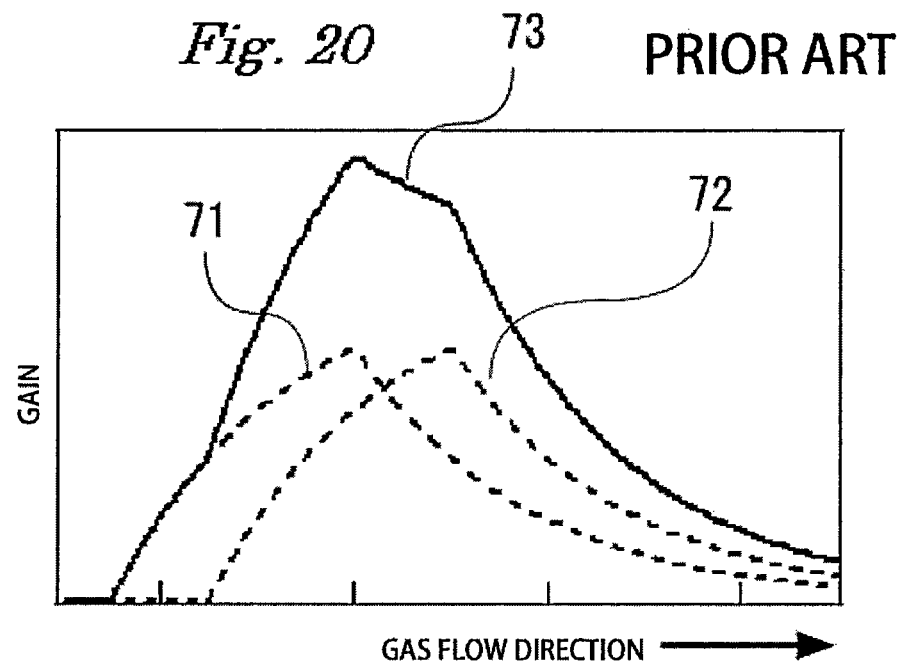
FIG. 20 is a graph showing an example of a gain distribution when a gas flow rate is lower than that shown in FIG. 18.
Figure 21:
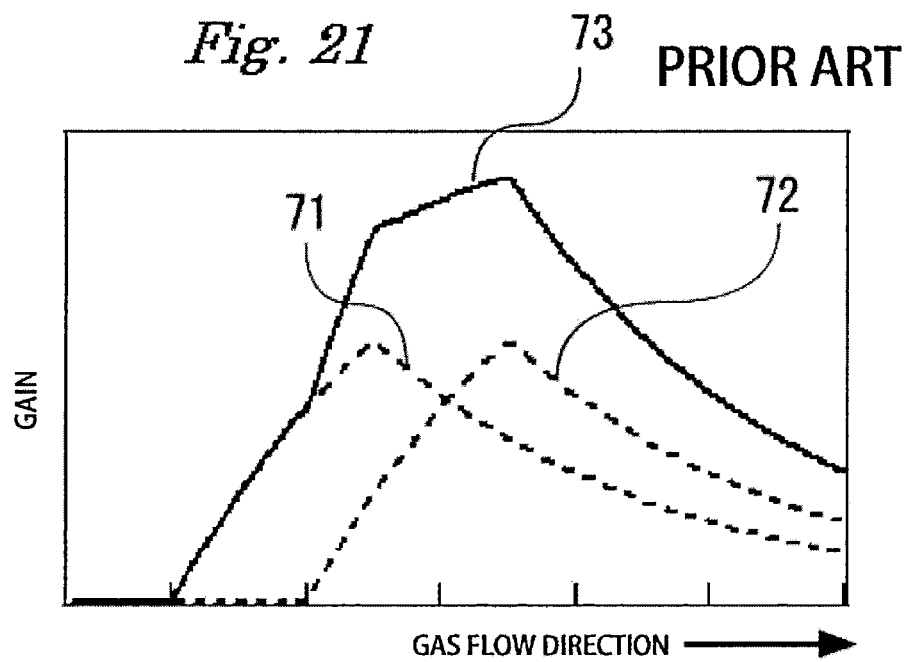
FIG. 21 is a graph showing an example of a gain distribution when an electrode width is smaller than that shown in FIG. 18.

In this embodiment, the distances d1 and d2 are set such that the peak positions of the gain distribution curves 16a and 16b formed by the two sets of discharge electrode pairs 1a and 1b coincide with the peak positions of the beam mode. Therefore, a laser is likely to be oscillated in a beam mode shape suitable for sheet metal working so as to prevent the beam oscillation in such an asymmetrical mode as shown in FIGS. 14A, 14B, and 14C. As a result, the sheet metal cutting ability can be improved.

Here, the aperture radius RA in the tri-axially orthogonal laser oscillator is set such that a loss of the beam is small and a beam mode shape can be defined. Therefore, the aperture radius RA is preferably set to about twice the fundamental mode diameter of the beam, that is, approximately RA≈2w.

In addition, in the intensity distribution 20 in the $TEM_{01}^*$ mode shown in FIG. 10B, when Rp is the peak position, $Rp=w/\sqrt{2}$. In this embodiment, the peak position Rp is equal to the distance d from the optical axis to the gas downstream end of the discharge electrodes, that is, Rp=d(=d1=d2). Therefore, a relation of $RA=d\times 2\sqrt{2}$ is preferably satisfied.

For example, in the tri-axially orthogonal $CO_2$ laser device, as described in Embodiment 1, the aperture radius RA is typically set to about 5 mm to 15 mm. Therefore, the distance d preferably satisfies an inequality of 1.8 mm≤d≤5.3 mm.

Figure 11:
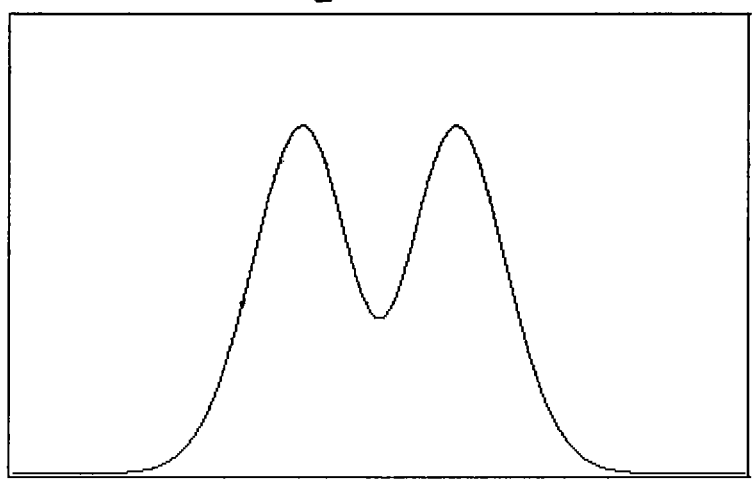
FIG. 11 is a graph showing an intensity distribution of a mode in which a $TEM_{01}*$ mode and another symmetrical mode (e.g., $TEM_{00}$) are mixed.
Figure 12:
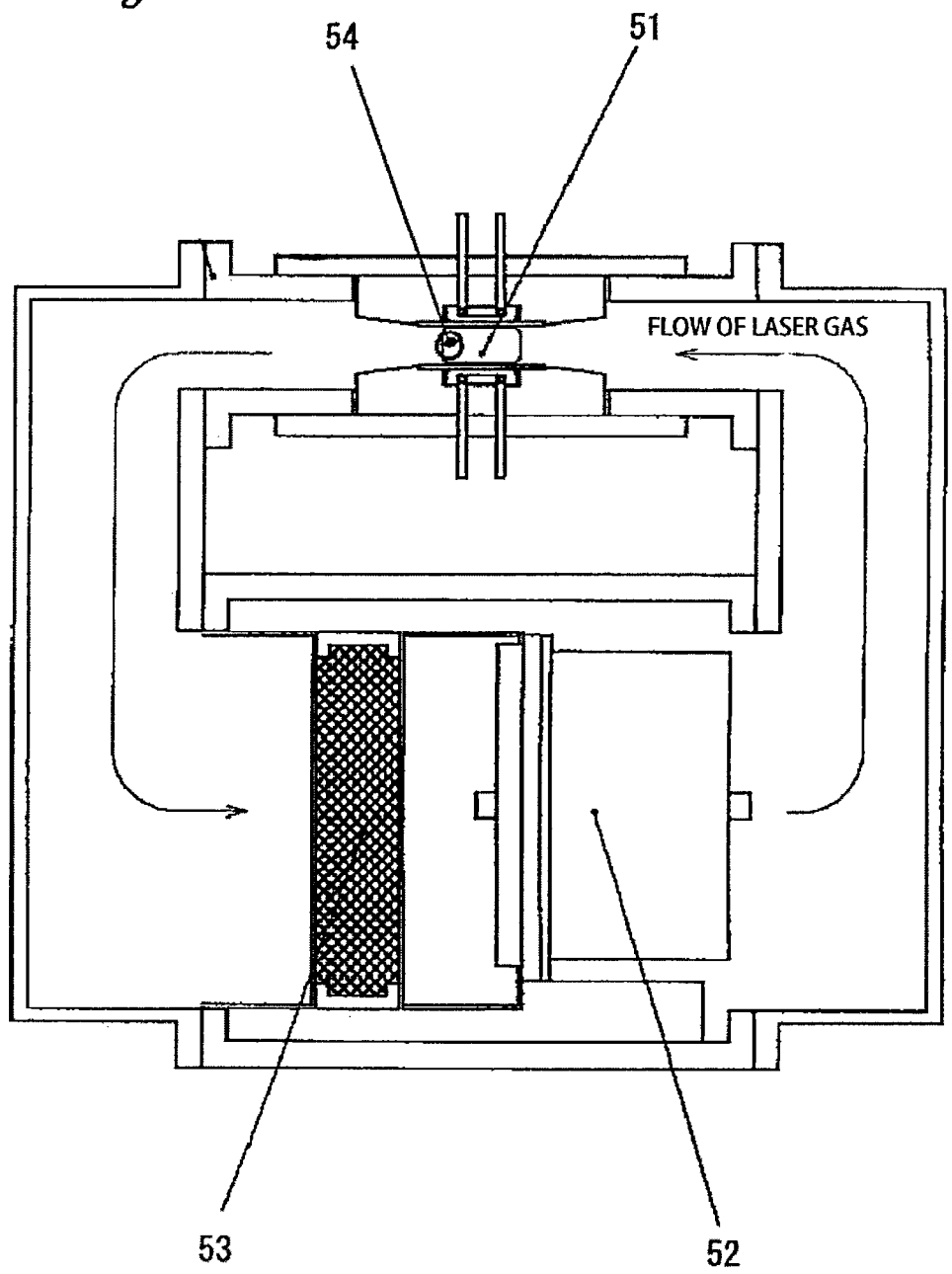
FIG. 12 is a configuration view showing an example of a conventional gas laser device.
Figure 13:
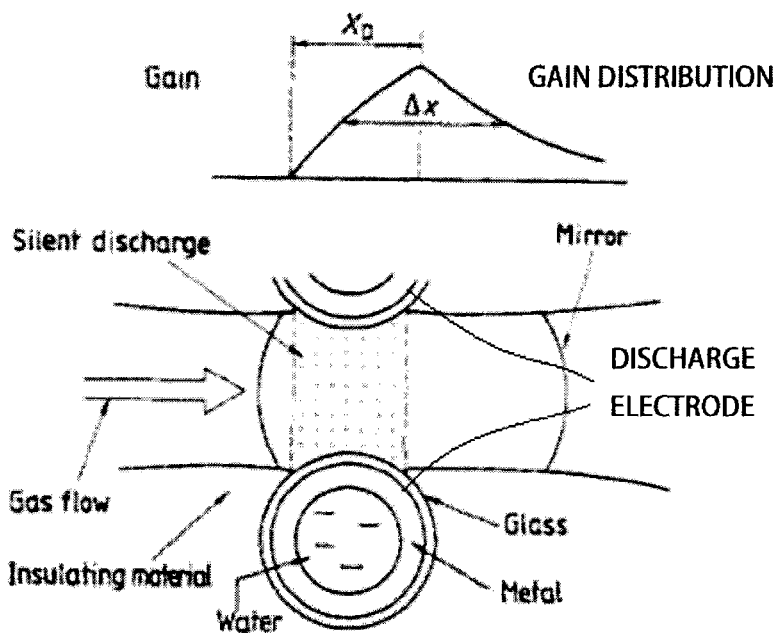
FIG. 13 shows a relationship between a gain distribution and a position of discharge electrode in a tri-axially orthogonal $CO_2$ laser oscillator.

FIG. 11 is a graph showing an intensity distribution of a mode in which the $TEM_{01}^*$ mode and another symmetrical mode (e.g., $TEM_{00}$) are mixed, and the $M^2$ value is 1.8. In addition, FIGS. 24 to 33 show beam modes in which the $M^2$ value is 1.8 to 3. However, similarly to the $TEM_{01}^*$ mode, the same effect can be obtained by these modes by setting the distance d such that the peak position of the total gain distribution coincides with the torus-shaped peak position on the outermost side of the beam mode. When Rp is the peak position, the peak position of these modes is $Rp=w/(M^2 \text{value})^{1/2}$. In this embodiment, the peak position Rp is equal to the distance d from the optical axis to the gas downstream end of the discharge electrodes, that is, Rp=d(=d1=d2) is set. Therefore, a relation of $RA=d\times 2(M^2 \text{value})^{1/2}$ is preferably satisfied.

Incidentally, each of the above-described embodiments exemplifies that $CO_2$ is used as the laser gas. However, the present invention is applicable even when another laser gas, e.g., CO, $N_2$, He—Cd, HF, $Ar^+$, ArF, KrF, XeCl, or XeF, is used.

(Embodiment 3)

A laser processing device according to this embodiment includes: the gas laser device disclosed in Embodiments 1 and 2; a focusing optical system for focusing the laser beam outputted from the gas laser device toward a workpiece; a processing table for moving the workpiece in a desired direction and stopping the workpiece at a desired position, or the focusing optical system which can be moved and focus the laser beam onto a desired position of the workpiece. As described above, the beam mode excellent in symmetry, e.g., the laser beam in the $TEM_{01}^*$ mode, is used to perform cutting, marking, boring, welding, adhesion, or surface modification. Therefore, laser processing can be performed with high quality.

EXPLANATORY NOTE 1a, 1b Discharge electrode pair
2 Partial reflection mirror
3, 4 Folding mirror
5 Total reflection mirror
6a, 6b Aperture member
7a, 7b Heat exchanger
8a, 8b Blower
9a, 9b Gas duct
10a, 10b, 10c Optical axis
11 Housing
14a, 14b Discharge space
U1, U2 Exciting unit

The invention claimed is:

1. A tri-axially orthogonal gas laser device in which an optical axis of an optical resonator, a direction in which a laser gas is supplied into the optical resonator, and a direction of discharge for exciting the laser gas are mutually orthogonal to one another, the device comprising:

a first exciting unit including a first gas supply mechanism for supplying the laser gas in a first gas flow direction to the optical axis of the optical resonator, and a first discharge electrode pair which is shifted on an upstream side of the first gas flow direction with respect to the optical axis; and a second exciting unit including a second gas supply mechanism for supplying the laser gas in a second gas flow direction opposite to the first gas flow direction to the optical axis of the optical resonator, and a second discharge electrode pair which is shifted on an upstream side of the second gas flow direction with respect to the optical axis;

wherein in the first discharge electrode pair and the second discharge electrode pair, the upper and lower electrodes of the respective electrode pairs have the same width in the respective first and second gas flow directions, and the electrodes are so arranged that when observed in the direction of discharge, a distance between the optical axis of the optical resonator and the first discharge electrode pair is equal to a distance between the optical axis of the optical resonator and the second discharge electrode pair, and the electrode width of the first discharge electrode pair is equal to the electrode width of the second discharge electrode pair, thereby achieving a gain distribution of the laser gas symmetrical with respect to a plane which is perpendicular to the gas flow direction and includes the optical axis of the optical resonator, the gain distribution having two peaks of gain and a lower gain in the center portion thereof, and the optical resonator includes a plurality of mirrors including two folding mirrors, and a plurality of aperture members each having a circular opening for defining an optical path of a laser beam, an aperture member in the plurality of aperture members being located near one of the two folding mirrors, and a beam mode is produced so that an $M^2$ value is 1.8 to 3 and a peak of intensity distribution is torus-shaped in a plane flush with one of the circular openings near the two folding mirrors.

2. The gas laser device according to claim 1, wherein the torus-shaped beam mode is a $TEM_{01}^*$ mode.

3. The gas laser device according to claim 1, wherein both the distance between the optical axis of the optical resonator and a gas flow downstream end of the first discharge electrode pair and the distance between the optical axis and a gas flow downstream end of the second discharge electrode pair coincide with a distance from a center of the torus-shaped beam mode to a peak position.

4. The gas laser device according to claim 1, wherein a beam radius w of fundamental mode in one of the circular openings near the two folding mirrors, the distance d between the optical axis of the optical resonator and the discharge electrode pair, and the radius RA of the circular opening satisfy relations of $d=w/(M^2)^{1/2}$ and $RA=d\times 2(M^2)^{1/2}$.

5. The gas laser device according to claim 1, wherein a first one of the two folding mirrors is arranged at a first end of the optical resonator, a second one of the two folding mirrors is arranged at a second end of the optical resonator, and a first one of the plurality of aperture members is arranged adjacent to the first one of the two folding mirrors, and a second one of the plurality of aperture members is arranged adjacent to the second one of the two folding mirrors.

* * * * *